(12) United States Patent
Semeia

(10) Patent No.: US 7,398,794 B2
(45) Date of Patent: Jul. 15, 2008

(54) FIRST STAGE PRESSURE REDUCING VALVE HAVING A TUBULAR PLUG, PARTICULARLY FOR REGULATORS OF SCUBA BREATHING APPARATUS

(75) Inventor: Roberto Semeia, Lavagna (IT)

(73) Assignee: Scubapro Europe S.r.l., Casarza Ligure (GE) (IT)

( * ) Notice: Subject to any disclaimer, the term of this patent is extended or adjusted under 35 U.S.C. 154(b) by 323 days.

(21) Appl. No.: 10/448,072

(22) Filed: May 30, 2003

(65) Prior Publication Data

US 2003/0221726 A1    Dec. 4, 2003

(30) Foreign Application Priority Data

May 30, 2002    (IT)    ............................ SV2002A0026

(51) Int. Cl.
*F16K 17/36*    (2006.01)
*F16L 53/00*    (2006.01)
*F28F 9/00*    (2006.01)

(52) U.S. Cl. .......................... 137/81.1; 137/338; 165/67

(58) Field of Classification Search ................ 137/81.1, 137/338; 128/205.24, 204; 165/67
See application file for complete search history.

(56) References Cited

U.S. PATENT DOCUMENTS

| 2,496,452 | A | * | 2/1950 | Eichenberg et al. | .......... 251/327 |
| 3,411,746 | A | * | 11/1968 | Scaramucci | ............ 251/315.08 |
| 3,548,862 | A | * | 12/1970 | Teruo et al. | .................. 137/340 |
| 3,924,619 | A | * | 12/1975 | Banjavich et al. | ....... 128/204.17 |
| 4,967,780 | A | * | 11/1990 | Minami | ......................... 137/60 |
| 5,097,860 | A | | 3/1992 | Ferguson et al. | |
| 5,265,596 | A | * | 11/1993 | Sauze | ..................... 128/205.24 |
| 5,685,297 | A | | 11/1997 | Schuler | |

FOREIGN PATENT DOCUMENTS

| EP | 0512887 | 11/1992 |
| WO | WO 01/10709 | 2/2001 |

* cited by examiner

*Primary Examiner*—Ramesh Krishnamurthy
*Assistant Examiner*—Andrew J Rost
(74) *Attorney, Agent, or Firm*—Reinhart Boerner Van Deuren P.C.

(57) ABSTRACT

The invention relates to a first stage pressure reducing valve having a tubular plug, particularly for regulators of scuba breathing apparatus. According to the invention, at least a portion of the outer surface of the valve has fins (19, 19') for heat exchange with the outside environment, designed to prevent or reduce the formation of ice (18) caused by the temperature drop generated by gas expansion inside the valve.

1 Claim, 5 Drawing Sheets

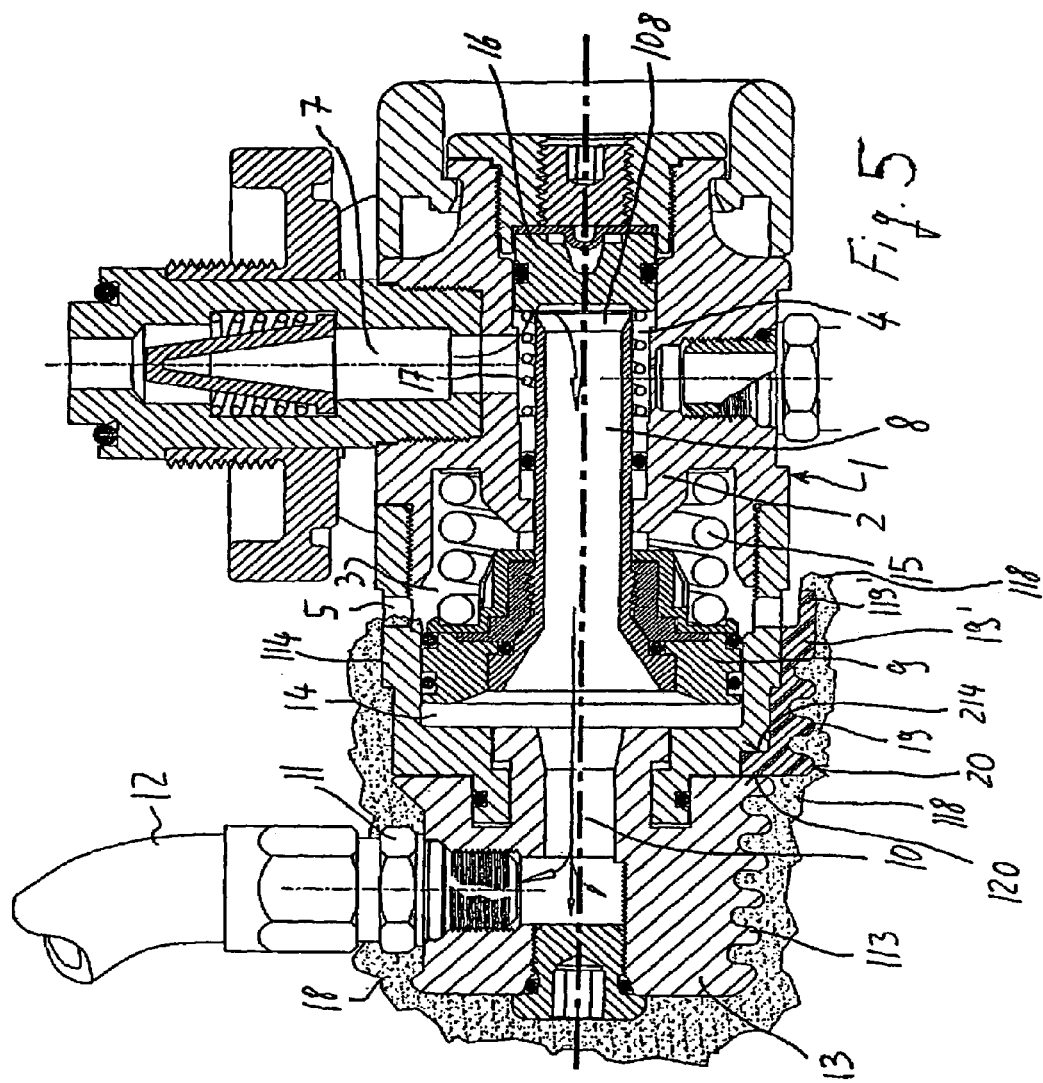

FIRST STAGE PRESSURE REDUCING VALVE HAVING A TUBULAR PLUG, PARTICULARLY FOR REGULATORS OF SCUBA BREATHING APPARATUS

The invention relates to a first stage pressure reducing valve having a tubular plug, particularly for regulators of scuba breathing apparatus.

Various devices are known that can accomplish this function. This invention particularly addresses a first stage of pressure reduction in air supplied by a pressure source, generally one or more bottles. Then said lower pressure air is supplied to a second stage, which further reduces its pressure and adapts it for breathing purposes. This type of first stage valves generally has two axially adjacent chambers, separated by a partition wall, one having the function of automatically compensating outlet pressure with reference to ambient pressure and communicating with the outside environment through one or more holes or apertures in the peripheral wall, and the other, the so-called pressure chamber, communicating with a compressed air source, whereas a tubular plug passes slidably and tightly through the partition, which plug is open at both ends, one end being in the compensation chamber and the other end being in the pressure chamber, the end situated in the compensation chamber having a widened piston-like head which is arranged to slide in a tight manner in the compensation chamber, and to separate the latter from an outlet chamber situated on the piston side opposite to the partition wall, and in which the respective end of the tubular plug opens, creating a passage for communication with the pressure chamber, a helical pressure spring, particularly coaxial to the tubular plug, being interposed between said piston-like head of the tubular plug and the partition wall, which helical spring pushes the plug toward the opening position, while the same plug is pushed toward the closing position by the air pressure in the outlet chamber.

This type of valves, particularly in very low temperature water diving, and especially in fresh water, may be exposed to a potentially serious drawback, that may even be dangerous for the diver's safety. The rapid expansion of the gas supplied by the high pressure source, occurring in the outlet chamber, is an adiabatic process which causes a considerable temperature drop in the surrounding environment, due to energy absorption by the gas. The parts that are mostly affected by this temperature drop are the tubular plug body, which forms the passage for communication between the pressure chamber and the outlet chamber, the enlarged plug head and the boundary wall of the outlet chamber and the compensation chamber. In this connection, it shall be noted that the boundary wall of these two chambers is partly shared thereby, since the outlet chamber is formed by the sliding motion of the enlarged head, caused by progressive gas expansion. The transfer of cold to the outside may lead to a progressive formation of ice upon the outer surface of the boundary wall of the outlet chamber and of the compensation chamber, further facilitated by the fact that this wall is generally made of metal having a high thermal conductivity and that, as is known, water has a high heat capacity. Ice formation may extend by progressive accumulation to the compensation hole area, resulting in a reduction of hole diameters or even in hole obstructions, whereby the communication of the compensation chamber with the outside environment is reduced or even prevented. Also, since water inside the compensation chamber is substantially stationary and there is a very small exchange with the outside environment due to the poor pumping effect generated by the reciprocating motion of the elnarged plug head, ice may even form between the turns of the spring thereby preventing the proper sliding motion of the tubular plug. Ice formation in the compensation chamber and/or on the outer surface of the outlet chamber and/or the compensation chamber may have very serious consequences, including permanent valve opening, and fast bottle depletion.

Various arrangements have been proposed to obviate this serious drawback, all being based on the interposition of two or more thermal insulating members between the various metal surfaces in contact with each other and/or with cold water and/or with outside water and/or with the water of the compensation chamber. One of these arrangements also consists in coating the helical spring with a heat insulating material. These arrangements are all designed to generate a discontinuity in cold transfer from the air in the outlet chamber to the various metal parts in contact with it and with each other, and from the latter to water, so that icing may be reduced. Nevertheless, these well known arrangements involve a more difficult manufacture of the valve, and an increase of the cost thereof. Moreover, certain parts, particularly the tubular plug body, cannot be heat insulated, whereby cold is still transmitted, though to a reduced extent, from the inside to the outside.

Therefore, this invention has the object of obviating the above drawbacks and providing, by simple and inexpensive means, a first stage pressure reducing valve having a tubular plug like the one described hereinbefore, which ensures proper and full operation in any situation whatsoever, particularly in very low temperature water diving, with no or very little ice formation, anyway insignificant for proper valve operation.

The invention achieves the above purposes by providing a first stage pressure reducing valve having a tubular plug like the one described hereinbefore, wherein at least a portion of the outer surface of the valve has fins for heat exchange with the outside environment. First, it shall be noted that this invention is based on a principle which is the inverse of the one normally used in prior art valves to prevent the formation of ice, i.e. valve insulation. Since diving water always has a temperature above the icing point, the arrangement was found to increase the heat exchange surface between the valve body and the outside environment, so that the valve body may be "heated" by external water, such heating action being facilitated by the high heat capacity of water.

From EP 512887 it is known to provide fins on the inlet union of a second stage valve of a scuba breathing apparatus. Here, fins are provided on the outer surface of the union, upstream from a piston-like plug which opens and closes the inlet pipe communicating with said union. Hence, according to this arrangement, fins are provided in the high pressure area of the reducing valve, which is also a diaphragm valve at the second stage.

Apart from the fact that the most significant pressure reduction, hence the adiabatic expansion and cooling resulting therefrom, occur in the first stage reduction valve, whereby the proposed arrangement does not solve the icing problem at the first reduction stage, fins are provided in the high pressure area, where cooling is less significant.

Another important consideration to be made is that the malfunctioning of reducing valves, particularly of first stage reducing valves, and more particularly to those having a tubular plug (as the one described above), is mainly caused by water freezing in the compensation chamber and between the spring turns, acting on the tubular plug in the opening direction. In fact, icing between the spring turns, prevents the spring from operating properly, due to the reduction of its spring modulus in proportion to the turns blocked by ice, and has detrimental effects on the equilibrium of forces, which is a basic condition for proper metering of air supplied to the outlet chamber of the valve.

Due to the above, the invention is aimed at providing heat exchange fins in the low pressure area of the chamber/s of the reducing valve.

Particular advantages are obtained from the provision of fins for heat exchange with the surrounding environment on at least a portion of the outer boundary wall of the outlet chamber and/or the compensation chamber. In fact these chambers were found to the mostly exposed to adiabatic expansion cooling, therefore to icing. Further, heat exchange with the outside environment is allowed in the spring containing chamber, thereby effectively obviating any malfunctioning due to ice formation between the spring turns or around the spring.

In accordance with a first embodiment, which will be described in greater detail in the description of the drawings, said fins may be made of one piece with the outer boundary wall of the outlet chamber and/or the compensation chamber.

Said outer wall may have a substantially cylindrical shape, and communicate, at one of its axial ends, with an axial terminal for connection to an air outlet pipe, particularly used to supply air to the second stage which further reduces pressure to a breathable level. In this connection, it shall be noted that most of the pressure reducing function is accomplished by the first stage, e.g. from 300 to 30 atmospheres, and it is also for this reason that the first stage is particularly exposed to cooling.

Fins may extend continuously along the whole outer surface of the boundary wall of the outlet chamber and/or the compensation chamber. In accordance with a preferred embodiment, the latter may be provided in the form of individual annular flanges, coaxial to said chamber/s and axially spaced to a predetermined extent. However, the word fins as used in this description shall be generally intended as indicative of heat exchange surfaces or projections of any shape, anyway used to extend the boundary wall of the outlet chamber and the compensation chamber to increase the heat exchange with the outside environment. The above preferred embodiment of fin construction has construction simplicity advantages, due to the facts that fins may be obtained by forming simple axially spaced annular grooves, which are strong and even less annoying and dangerous for the user as compared to other different arrangements. An additional important function of said fins consists in preventing, even by mechanical means, the formation of ice caused by the transfer and/or progressive accumulation of the ice mass as compared with the results that would be obtained with a smooth wall.

The holes whereby the communication chamber communicates with the outside environment may be arranged along a peripheral annular band of the compensation chamber boundary wall.

Fins may also extend axially up to the hole area and end at the edge of said holes turned towards the connection terminal.

In a second embodiment, which will be described in greater detail in the description of the drawings, the fins designed for heat exchange with the outside environment may be at least partly added thereto, and consist of a separate finned bush-like element which is applied to the outside of the boundary wall of the outlet chamber and/or the compensation chamber, and is made of a highly heat conductive material, particularly of a metal material, such as brass or the like. This second arrangement has the advantage that the outside diameter of the added element may be much longer than in the one-piece solution, thanks to the fact that it does not depend on the processing diameter of the cup- or hood-like element which forms the outside boundary wall of the outlet chamber and the compensation chamber. Obviously, the applied element must also have excellent heat conductivity properties. An additional advantage of the above second embodiment may be the possibility of modifying existing finless reducing valves by laying an appropriate finned member over them.

This finned element may be held in position by screwing or force fitting it or the like. Alternatively thereto or in combination therewith, the latter may be held axially between the connection terminal and an annular shoulder provided along the outer surface of the boundary wall of the outlet chamber and/or the compensation chamber.

Particularly, this outer wall may be formed in such a manner that it tapers in annular steps toward the end for connection to the connection terminal whereas the applied finned element may have a corresponding inside shade which tapers in steps toward the connection terminal.

The applied finned element may have, at its end turned towards the connection terminal, an annular inside shoulder and may be held in position by the clamping action of the connection terminal against the opposite face of a corresponding annular step which is provided along the outer boundary surface of the outlet chamber and the compensation chamber.

With reference to both the embodiments prescribed above, the fin that is provided in the hole area may have at least one additional annular fin disposed over the holes at a certain distance therefrom, which leaves a communication passage from the compensation chamber to the outside environment, whose axis is oriented transverse, particularly perpendicular, to the hole axis.

By this arrangement, a sort of partition or screen is formed for hole protection, which mechanically prevents any formation of ice "bridges" over the holes. Even when one or more of these bridges are formed, the above mentioned supplementary fin anyway leaves a free passage for water between two adjacent bridges.

According to a highly advantageous improvement, at least a portion of the boundary wall of the connection terminal may be also provided with fins for heat exchange with the outside environment, since the connection terminal is in heat exchanging contact with the boundary wall of the outlet chamber and/or the compensation chamber and is a cold air transit zone, hence it is itself exposed to cooling. These fins may be at least partly made of one piece with the connection terminal body, or may be at least partly added thereto, and made in a manner similar to the fins provided on the outer boundary wall of the outlet chamber and the compensation chamber.

The advantages of this invention are apparent from the above disclosure, and substantially consist in allowing, by very simple and inexpensive means, a better heat exchange between the valve body and the outside environment by extending the surface in contact with water. Hence, the outside water "heats" the various cooled parts of the valve, thereby counterbalancing the cooling effect caused by air expansion. The whole is obtained by implementing an arrangement having a very simple and inexpensive construction. Further, heat exchange is further facilitated in the valve parts that are more exposed to cooling or to malfunctioning due to icing, and that strongly affect the pressure reducing valve operation.

Further characteristics and improvements will form the subject of the dependent claims.

The characteristics of the invention and the advantages derived therefrom will be more apparent from the following detailed description of the annexed drawings, in which.

Figure 1:
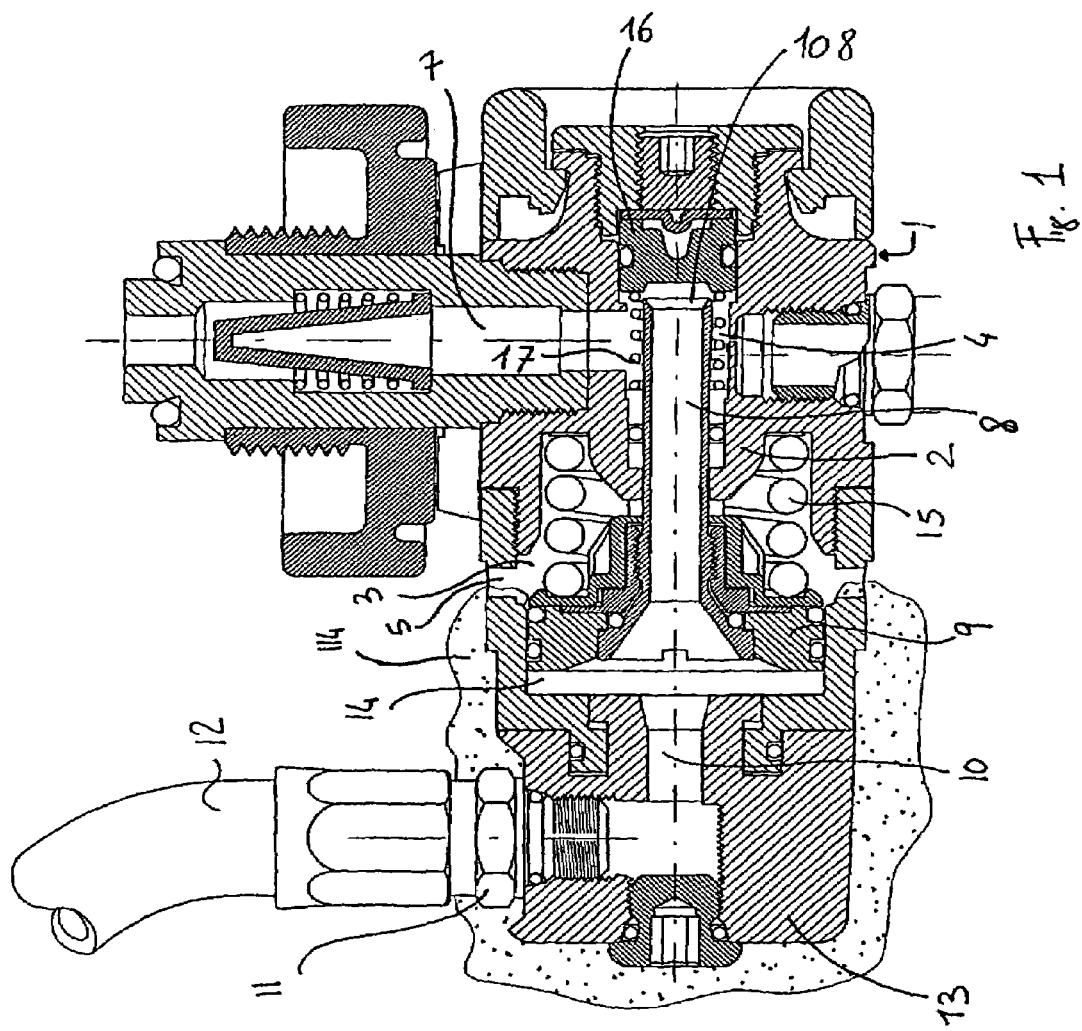
FIG. 1 is a longitudinal sectional view of a first embodiment of a first stage pressure reducing valve having a tubular plug according to the invention, in which the upper axial half shows the prior art and the other axial half shows the invention, with reference to the axis of the tubular plug.

The two embodiments of first stage pressure reducing valves having a tubular plug, as shown in the drawings and designed according to the invention provide a reduced outlet pressure which is automatically controlled relative to ambient pressure and are pressure reducing valves for the first reduction stage of regulators for scuba breathing apparatus.

With reference to both figures, this type of pressure reducing valve includes a body 1 divided by a partition wall 2 into two separate and axially adjacent chambers 3 and 4. The chamber 3 is the so-called compensation chamber and communicates through one or more lateral holes 5 with the outside environment. The chamber 4 is the so-called pressure chamber and is connected through a lateral hole 7 and a fitting 6 in a well-known manner to a compressed gas (e.g. oxygen or air) bottle.

A tubular plug 8, whose ends are both open, passes in an axially and tightly slidable manner through the partition wall 2. The tubular plug 8 has an enlarged head 9 at the end projecting into the compensation chamber 3, which is made in the form of a piston and is tightly slidable in the body 1 of the valve, thereby separating the compensation chamber 3 from an outlet chamber 14, in which the corresponding end of the tubular plug 8 opens, and which is connected through a hole 10 to an axial terminal 13, whereto a pipe 12 is connected by means of a fitting 11, which supplies air to a second stage (not shown). A helical compensation spring 15 is provided between the piston-like head 9 of the tubular plug 8 and the partition wall 2. The other end 108 of the tubular plug 8, that projects into the pressure chamber 4, cooperates by the circular edge of its opening with a pad 16 which acts as the valve seat. A helical pressure spring 17 is provided in the pressure chamber 4 between the partition wall 2 and the pad 16.

The operation of such type of valves is well-known. Compressed air passes through the hole 7 and penetrates the pressure chamber 4, expanding through the open end 108 of the tubular plug 8, into the outlet chamber 14. Air pressure, which acts on the enlarged head 9 of the tubular plug 8, causes the plug 8 to slide until its end 108 contacts the pad 16 thereby preventing any further ingress of air into the outlet chamber 14. The tubular plug 8 slides against the action of the helical spring 15, which brings the tubular plug 8 back to the opening position when the outlet chamber 14 is emptied, for instance upon one or more breathing actions. The tubular plug 8 also slides against the pressure of the water wherein the diver dives which, by penetrating the compensation chamber 3 through the holes 5, counterbalances the pressure in the outlet chamber 14 relative to ambient pressure. This arrangement allows the diver to breathe air at a pressure that increases with the increase of the diving depth, hence of outlet pressure.

Referring to the upper axial half of both figures, and particularly to the axis of the tubular plug 8, a possible behavior of a prior art valve during diving, particularly in very low temperature water, next to the freezing point, is shown. The rapid expansion of air in the outlet chamber 14, which is required to reduce pressure enough to allow it to be appropriately supplied to the second stage, causes a cooling thereof and, as a result, of all metal parts wherewith it is in contact, particularly the boundary wall 114 of the outlet chamber 14 and the compensation chambers 3. This unavoidable fact may lead to the formation of an ice layer 18 outside the wall 114 and possibly, as shown in the figures, on the outer surface of the axial air outlet terminal 13. The ice layer 18 may progressively extend to reduce the diameter or even obstruct one or more of the holes 5 for communication of the compensation chamber 3 with the outside environment, thereby reducing or actually preventing its proper operation. Moreover, since there is a poor water exchange between the inside of the compensation chamber 3 and the outside, ice 18 may be formed even inside it, and particularly between the adjacent turns of the helical spring 15, thereby hindering or preventing the tubular plug 8 from sliding in the closing direction. The consequences thereof may be easily deducted and consist in an excessive expansion of air in the outlet chamber 14 when holes 5 are obstructed, since the air expansion action is only contrasted by the helical spring 15 and not by water outside pressure. Further, if the elastic movement of the spring 17 is blocked by ice, air expansion within the chamber 14 occurs to a reduced extent or does not occur at all. This may result in an improper air supply to the second stage and/or in a fast depletion of the bottle with easily deductible consequences In order to obviate such serious drawback a first embodiment of the invention, as shown in the lower axial half of FIG. 1 provides that the outer boundary wall 114 of the outlet chamber 14 and the compensation chamber 3 has a plurality of fins 19 which form a fin arrangement deigned for heat exchange with the outside environment 19, i.e. with the water wherein the valve is submersed, which water, always above 0° C., keeps the various exposed parts to a temperature above icing, thanks to the increase of the heat transfer surface provided by the fins 19, and hence it hinders or prevents icing. In such first embodiment, the heat transfer fins are made of one piece with the outer wall 114, whereas the fins 19 extend continuously along the whole outer surface of the wall 114 which has a substantially cylindrical shape and is made in the form of a hood or a cup. The fins 19 are made in the form of individual annular flanges 19, which are coaxial to the outlet chamber and the compensation chamber 3 and are axially spaced to a predetermined extent. In both illustrated embodiments, the axial connection terminal 13 is also provided with fins for heat exchange with the outside which are radial annular fins 113 like those provided on the outer wall of the outlet chamber 14.

Figure 2:
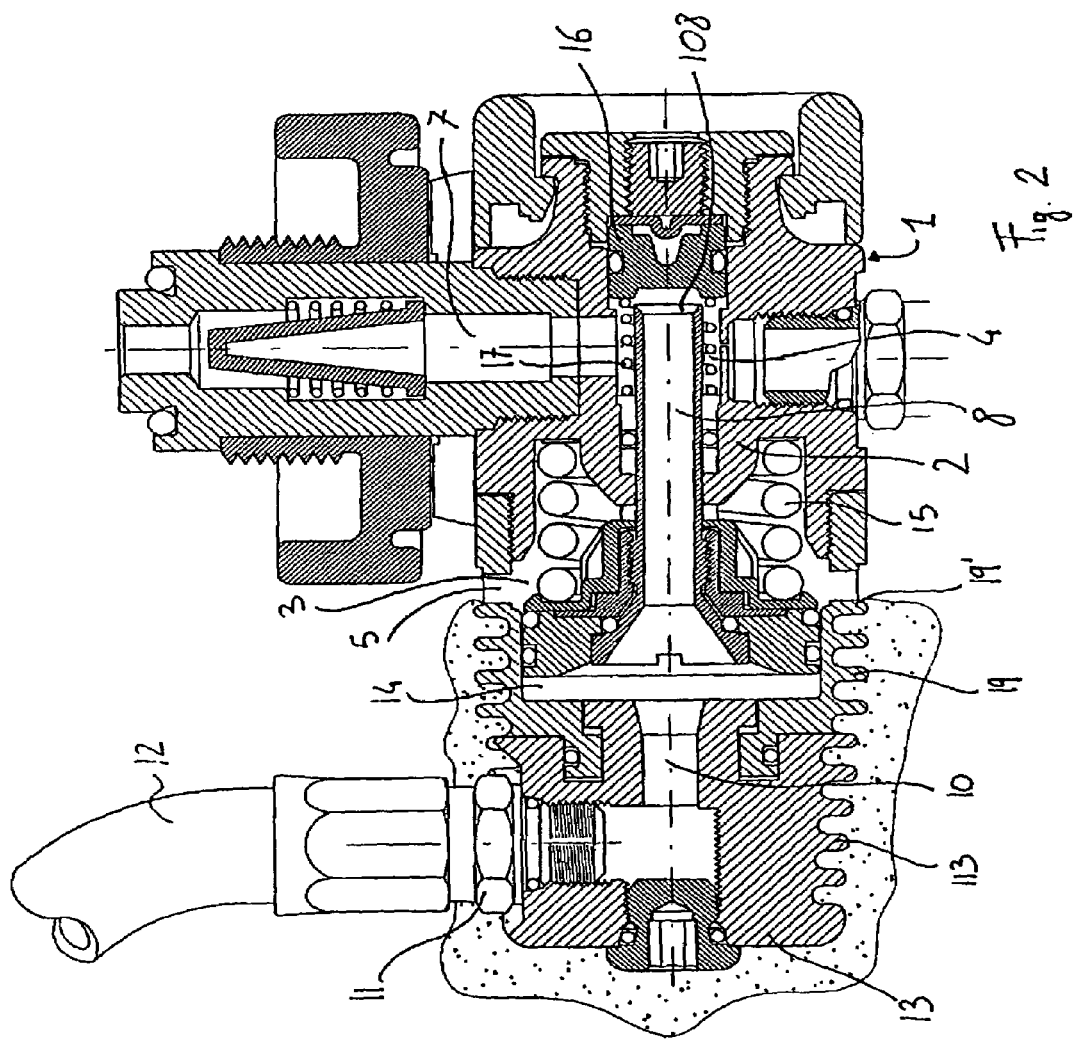
FIG. 2 is a longitudinal sectional view of a second embodiment of a first stage pressure reducing valve having a tubular plug according to the invention, in which the upper axial half shows the prior art and the other axial half shows the invention, still with reference to the axis of the tubular plug.
Figure 3:
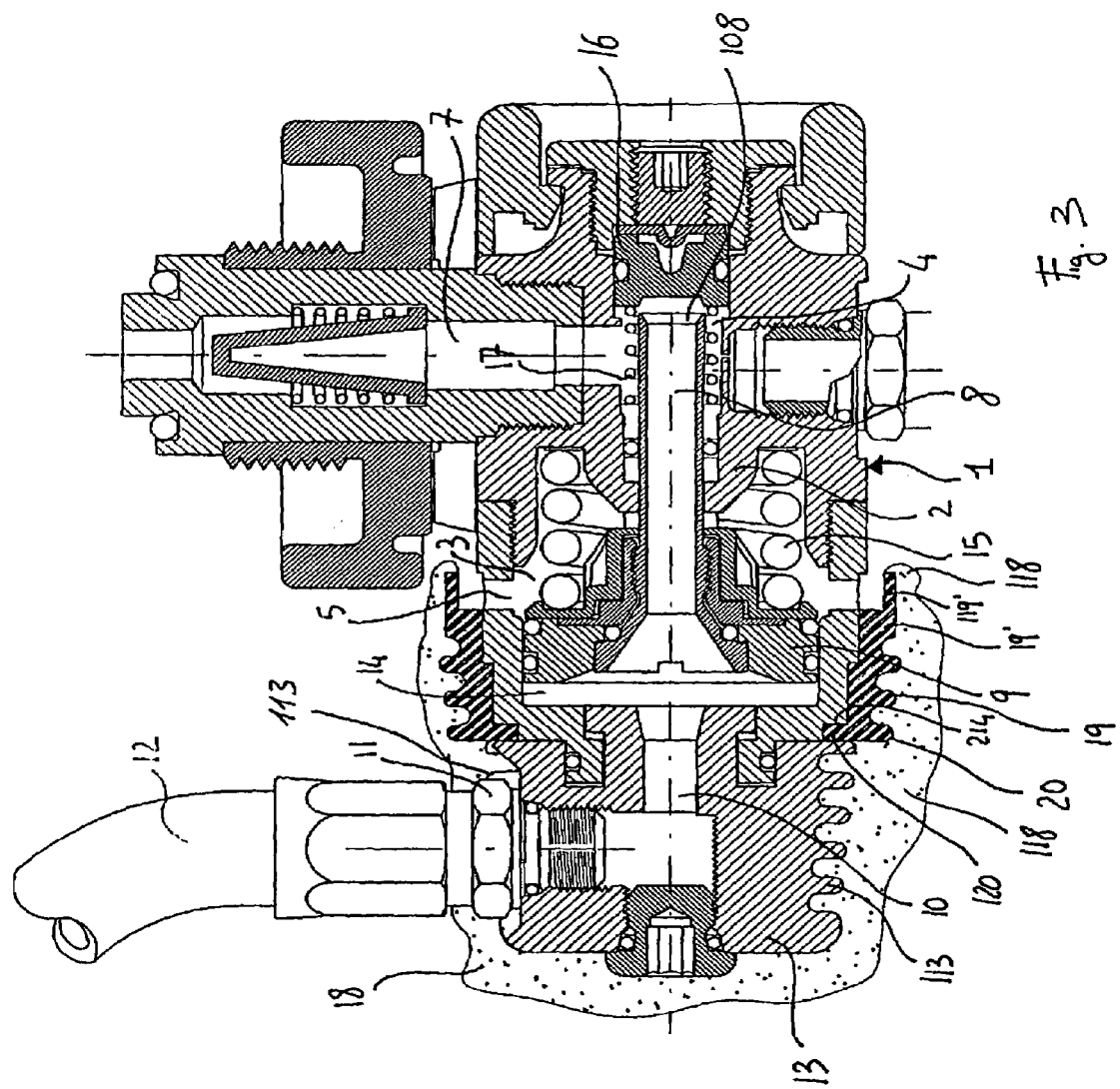
Figure 4:
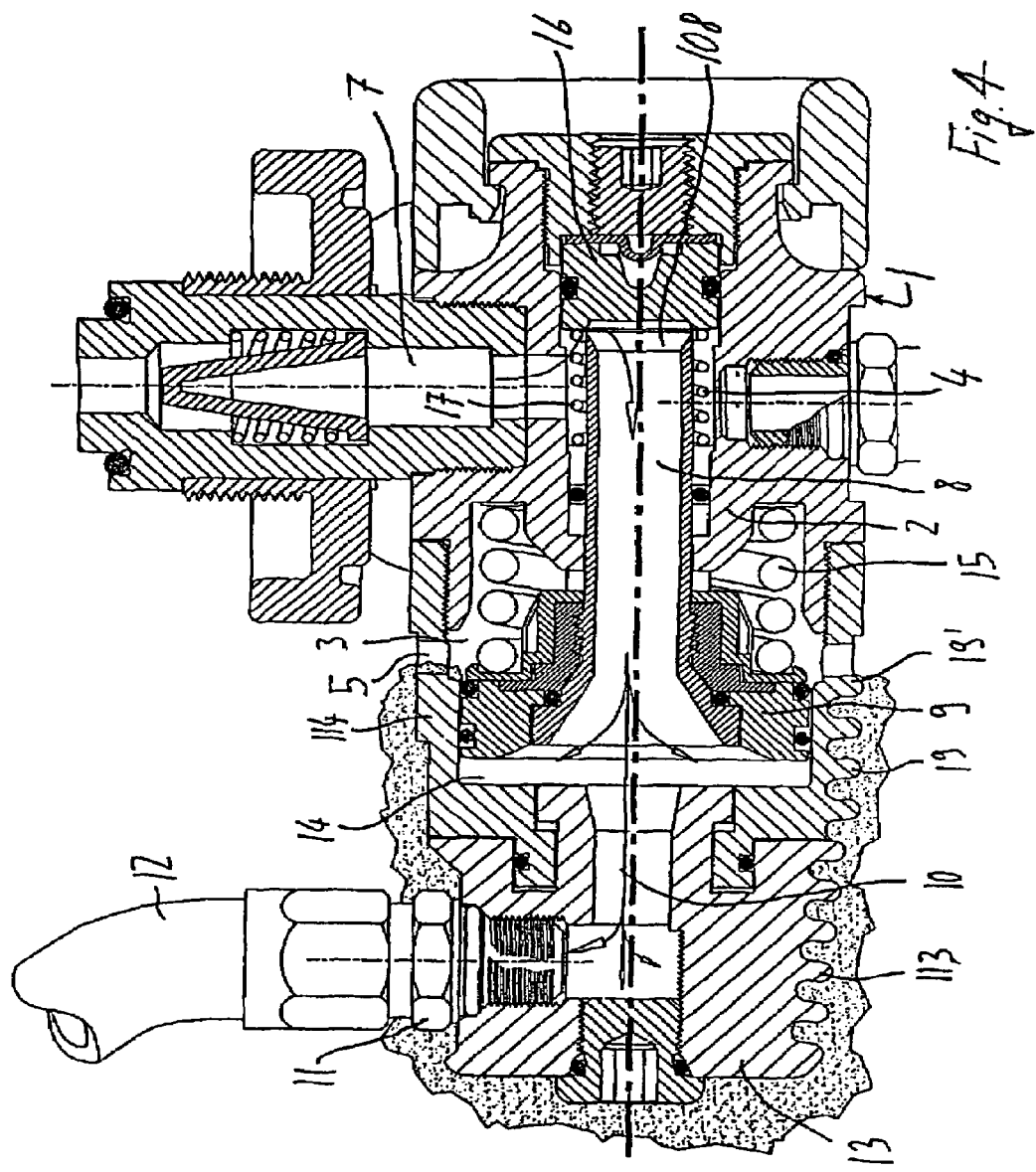

Referring now to FIG. 2, a second embodiment of the invention is shown, in which the fins are provided in a separate finned element 20 which has the form of a bush to be laid over the outer boundary wall 114 of the outlet chamber 14 and the compensation chamber 3. Nevertheless, the heat exchange fins 19 are made as provided in the previous embodiment. In this case, the outer wall 114 tapers in annular steps toward the end for connection to the connection terminal 13 whereas the applied finned element 20 may have a corresponding inside shape which tapers in steps toward the connection terminal 13. This finned element 20 has an inner annular shoulder 120, at its end turned toward the connection terminal 13, and is held axially in position thanks to the fact that the connection terminal 13 is clamped against the opposite face of a corresponding annular step 214 which is provided along the outer surface of the wall 114.

In accordance with an advantageous improvement, in both illustrated embodiments, the first fin 19' with reference to the air outlet direction, is provided next to the hole side 5 turned toward the connection terminal 13 for communication of the compensation chamber 3 with the outside environment, which holes 5 are provided along an annular peripheral band of the boundary wall 114 of said chamber 3. In order to further contrast the formation of ice 18 in the hole area 5, said first fin 19' has an additional annular fin 119' and lays over the holes 5 at a certain distance therefrom, thereby leaving a communication passage from the compensation chamber 3 to the outside environment. As is shown in the Figures, the latter annular fin 119' has the function of contrasting, even mechanically, the formation of ice 18 in the hole area 5, and even when bridges 118 or ice 18 are formed in this area, said fin 119' still allows communication between the compensation chamber 3 and the outside environment.

It shall be noted that the step-like outer tapers of the valve body and inner tapers of the ring of heat exchange fins, have the additional advantage of increasing the contact surface between said heat exchange ring and the reducing valve, thereby improving the heat exchange effects between said two parts.

Obviously, the invention is not limited to the two embodiments described and illustrated herein, but may be greatly varied, without departure from the guiding principle disclosed above and claimed below.

The invention claimed is:

1. A pressure reducing valve comprising a first stage regulator for scuba breathing apparatus, said first stage regulator having a valve body and a low pressure area with an outer boundary wall, said low pressure area including an outlet chamber (14) and a compensation chamber (3), wherein the outer boundary wall (114) of the low pressure area of the valve body having fins (19, 19') for heat exchange with the environment, wherein the first stage regulator has two axially adjacent chambers (3, 4), separated by a partition wall (2), one of said adjacent chambers being said compensation chamber (3) having the function of automatically compensating outlet pressure with reference to ambient pressure and communicating with the outside environment through one or more holes (5) or apertures in the outer boundary wall (114), and the other of said adjacent chambers being a pressure chamber (4), communicating with a compressed air source, wherein a tubular plug (8) passes slidably and tightly through the partition wall (2), which plug is open at both ends, one end being in the compensation chamber (3) and the other end (108) being in the pressure chamber (4), the end situated in the compensation chamber (3) having a widened piston-like head (9) which is arranged to slide in a tight manner in the compensation chamber (3), and to separate said compensation chamber (3) from said outlet chamber (14) situated on the side of the piston (9) which is opposite to the partition wall (2), and in which the respective end of the tubular plug (8) opens, creating a passage for communication with the pressure chamber (4), a helical pressure spring (15), coaxial to the tubular plug (8), being interposed between said piston-like head (9) of the tubular plug (8) and the partition wall (2), which helical spring pushes the plug (8) toward the opening position, while the same plug (8) is pushed toward the closing position by the air pressure in the outlet chamber (14), wherein the holes (5) for communication between the compensation chamber (3) and the outside environment are arranged along a peripheral annular band of the outer boundary wall (114) of said compensation chamber (3), wherein a fin (19') that is provided in the area with holes (5) has at least one additional annular fin (119') disposed over the holes (5) at a certain distance therefrom, which leaves a communication passage from the compensation chamber (3) to the outside environment, whose axis is oriented transversely perpendicular, to the hole axis (5).

* * * * *